No. 777,348. PATENTED DEC. 13, 1904.
R. Y. LUTHER.
ANTICALKING BOOT.
APPLICATION FILED MAR. 11, 1904.
NO MODEL.
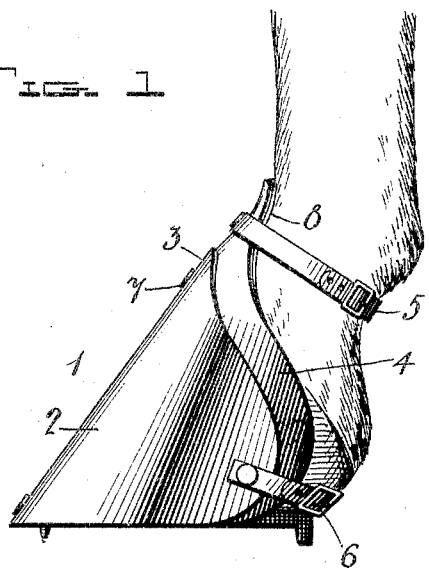
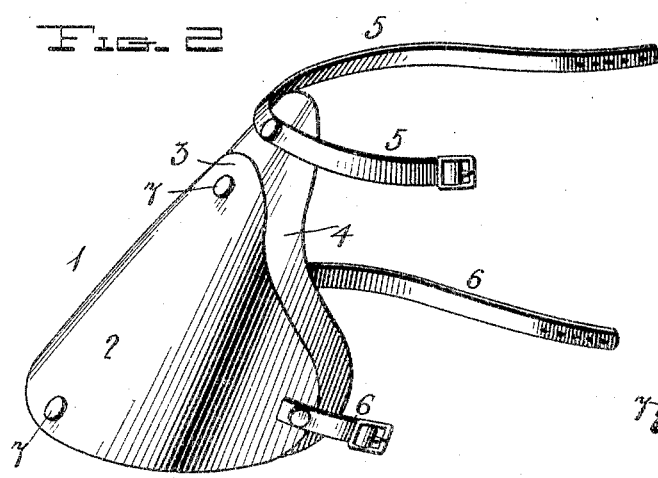
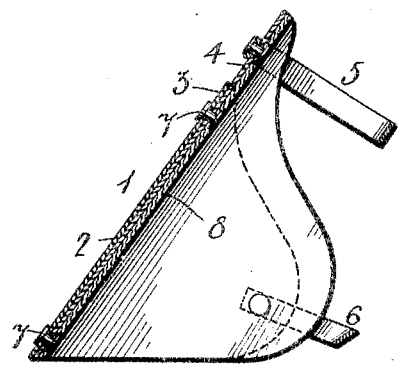
Witnesses
Inventor
R. Y. Luther
By Dudley, Browne & Norton
his Attorneys No. 777,348. Patented December 13, 1904.

UNITED STATES PATENT OFFICE.

ROLAND Y. LUTHER, OF VIVIAN, WEST VIRGINIA.

ANTICALKING-BOOT.

SPECIFICATION forming part of Letters Patent No. 777,348, dated December 13, 1904.

Application filed March 11, 1904. Serial No. 197,649. (No model.)

*To all whom it may concern:*

Be it known that I, ROLAND Y. LUTHER, a citizen of the United States, residing at Vivian, in the county of McDowell and State of West Virginia, have invented certain new and useful Improvements in Anticalking-Boots; and I do hereby declare the following to be a full, clear, and exact description of the invention, such as will enable others skilled in the art to which it appertains to make and use the same.

This invention, which relates to anticalking devices for animals, has for its object the provision of an improved boot adapted to be readily and quickly attached to and detached from the hoof and when attached to effectually prevent injury to the foot from calk and "never-slip" shoes while the animal is standing in harness or is in the stall. Such injury may occur in a number of ways—as, for example, from the habit of resting one hind foot on the other or in backing from the stall or between the shafts in harnessing—and frequently the injury is such as to temporarily disable the animal.

A feature of the invention is a metal guard constructed to extend over the foot and leg a considerable distance above the hoof, whereby the parts which usually receive the injury are effectually protected, and a further feature is the means employed for attaching the device in a manner to prevent displacement and accidental detachment.

Other features and points of advantage are described and set forth in the following detailed description of the invention, in connection with which reference is to be had to the accompanying drawings, illustrating the device in its preferred form of embodiment.

In the drawings, Figure 1 is a side elevation of my improved anticalking-boot attached to the hind foot of an animal. Fig. 2 is a perspective view of the boot. Fig. 3 is a vertical central sectional view of the same.

Referring to the drawings by numerals, 1 designates the boot which is more especially designed for attachment to the hind feet of animals. The boot comprises a guard 2, preferably of sheet metal, having an approximately-triangular form and bent to conform more or less closely to the curvature of the hoof. The top 3 of the guard extends above the upper line of the hoof to a point considerably above the parts which can be reached by the shoe on the other hind foot. Consequently said parts are effectually protected by an impenetrable surface against calking and even rubbing, supposing that the animal is unshod or is wearing summer shoes.

4 is a leather or similar flexible backing, which may have the same general outline as the guard, but which extends above the upper edge of the latter and conforms closely to the foot, the top reaching, preferably, well up on the leg. The boot is secured by an upper strap 5 and a lower strap 6, each equipped with a buckle or the like. The upper strap 5 is intermediately fastened to the flexible backing 4 and is passed around the fetlock, whereby the upper part of the boot is firmly secured without liability of accidental displacement. By reason of the attachment of the upper strap to the backing the latter is caused to conform closely to the foot and leg and presents a neat appearance. The lower strap is in two parts each riveted or otherwise secured to the lower rear edges of the guard and backing, and in practice said lower strap is passed around the back of the hoof, as shown. The guard and backing are fastened together at intervals, preferably, by rivets 7.

The shoe may be lined, as at 8, with felt or similar soft flexible material, thereby adding to the comfort of the animal and affording a cushion to prevent bruising when the hoofs strike or rest one on the other. Where the lining is employed, it may be secured by the rivets 7.

The provision of the smooth metallic guard extending above the parts which can be reached by the hoof effectually discourages the habit of supporting one foot by the other and will break an animal of said habit after a short time, whereupon the use of the boot may be dispensed with.

I claim as my invention—

An anticalking-boot for animals, comprising an imperforate metallic guard formed to cover and extend above the hoof, a similarly-formed flexible backing having an integral portion extending above the guard, a lower fastening-strap secured to the lower portion of the boot, an upper fastening-strap secured to the flexible backing extension whereby the latter in fastened position conforms to the leg of the animal, a soft inner lining, and devices for securing the guard, backing and lining together.

In testimony whereof I affix my signature in presence of two witnesses.

ROLAND Y. LUTHER.

Witnesses:
W. G. WILLIAMSON,
C. M. DAWSON.